(12) United States Patent
Nakamura

(10) Patent No.: US 11,919,454 B2
(45) Date of Patent: Mar. 5, 2024

(54) OCCUPANT MONITORING DEVICE FOR VEHICLE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 6 days.

(21) Appl. No.: 17/671,981

(22) Filed: Feb. 15, 2022

(65) Prior Publication Data

US 2022/0266764 A1 Aug. 25, 2022

(30) Foreign Application Priority Data

Feb. 24, 2021 (JP) .................... 2021-027739
Jan. 18, 2022 (JP) .................... 2022-005932

(51) Int. Cl.
| | | |
|---|---|---|
| *G02F 1/1333* | (2006.01) | |
| *B60K 35/00* | (2006.01) | |
| *B60R 1/29* | (2022.01) | |
| *B60R 11/04* | (2006.01) | |
| *G06V 20/59* | (2022.01) | |
| *H04N 23/51* | (2023.01) | |
| *H04N 23/55* | (2023.01) | |
| *B60R 11/00* | (2006.01) | |

(52) U.S. Cl.
CPC .............. *B60R 11/04* (2013.01); *B60K 35/00* (2013.01); *B60R 1/29* (2022.01); *G06V 20/597* (2022.01); *H04N 23/51* (2023.01); *H04N 23/55* (2023.01); *B60K 2370/21* (2019.05); *B60K 2370/816* (2019.05); *B60R 2011/0005* (2013.01); *B60R 2300/8006* (2013.01)

(58) Field of Classification Search
CPC ... B60R 11/04; B60R 1/29; B60R 2011/0005; B60R 2300/8006; G06V 20/597; H04N 23/51; H04N 23/55; B60K 35/00; B60K 2370/816; B60K 2370/21
See application file for complete search history.

(56) References Cited

U.S. PATENT DOCUMENTS

2019/0258112 A1\* 8/2019 Nagasaki ............... H04N 23/57
2020/0324780 A1\* 10/2020 Stec ........................ G06F 3/013

FOREIGN PATENT DOCUMENTS

| JP | 2019-014359 A | 1/2019 | |
|---|---|---|---|
| JP | 2019-014360 A | 1/2019 | |
| JP | 2019014359 A | * 1/2019 | ............. B60K 37/04 |

\* cited by examiner

*Primary Examiner* — Patrick E Demosky
(74) *Attorney, Agent, or Firm* — Rimon P.C.

(57) ABSTRACT

An occupant monitoring device for a vehicle includes an imager, a display, and a determiner. The imager is configured to image a cabin of the vehicle to monitor conditions of occupants in the vehicle. The display is configured to display a screen to be viewed by the occupants in the vehicle. The determiner is configured to determine the conditions of the occupants in the vehicle by using captured image data obtained by imaging each of the occupants by the imager while the screen is displayed on the display. A panel configured to display the screen of the display has a non-display area on an inner side of a rectangular frame circumscribing a display area of the screen. The imager is disposed on a back of the non-display area of the panel of the display.

11 Claims, 9 Drawing Sheets

FRONT ←→ REAR

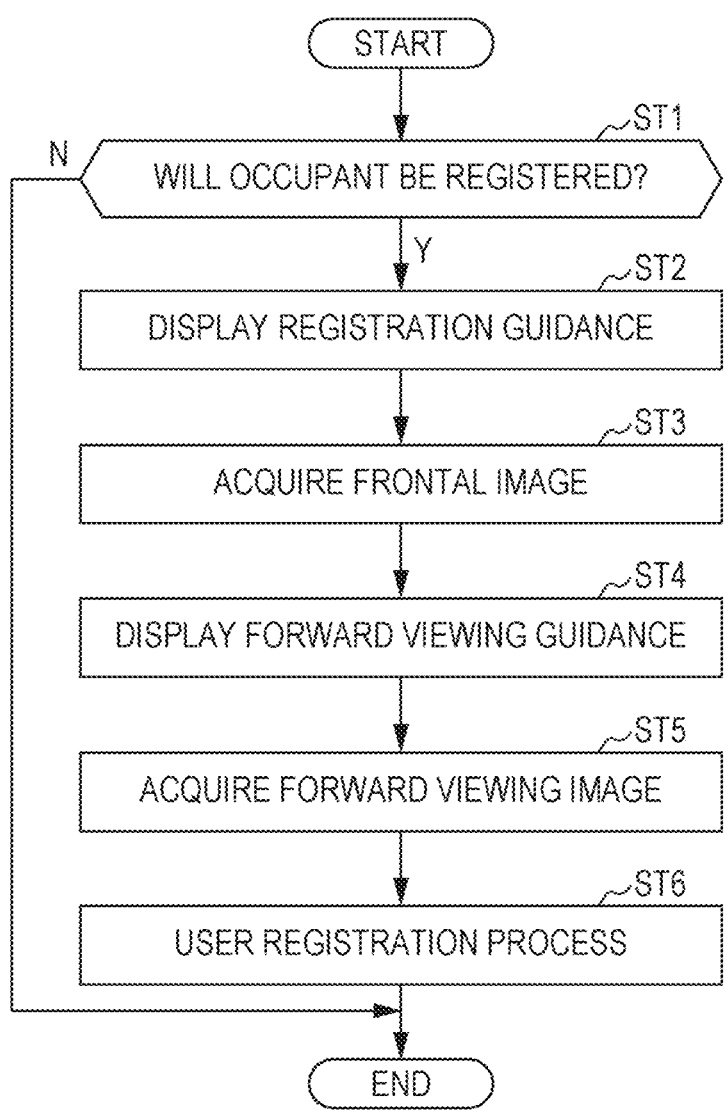

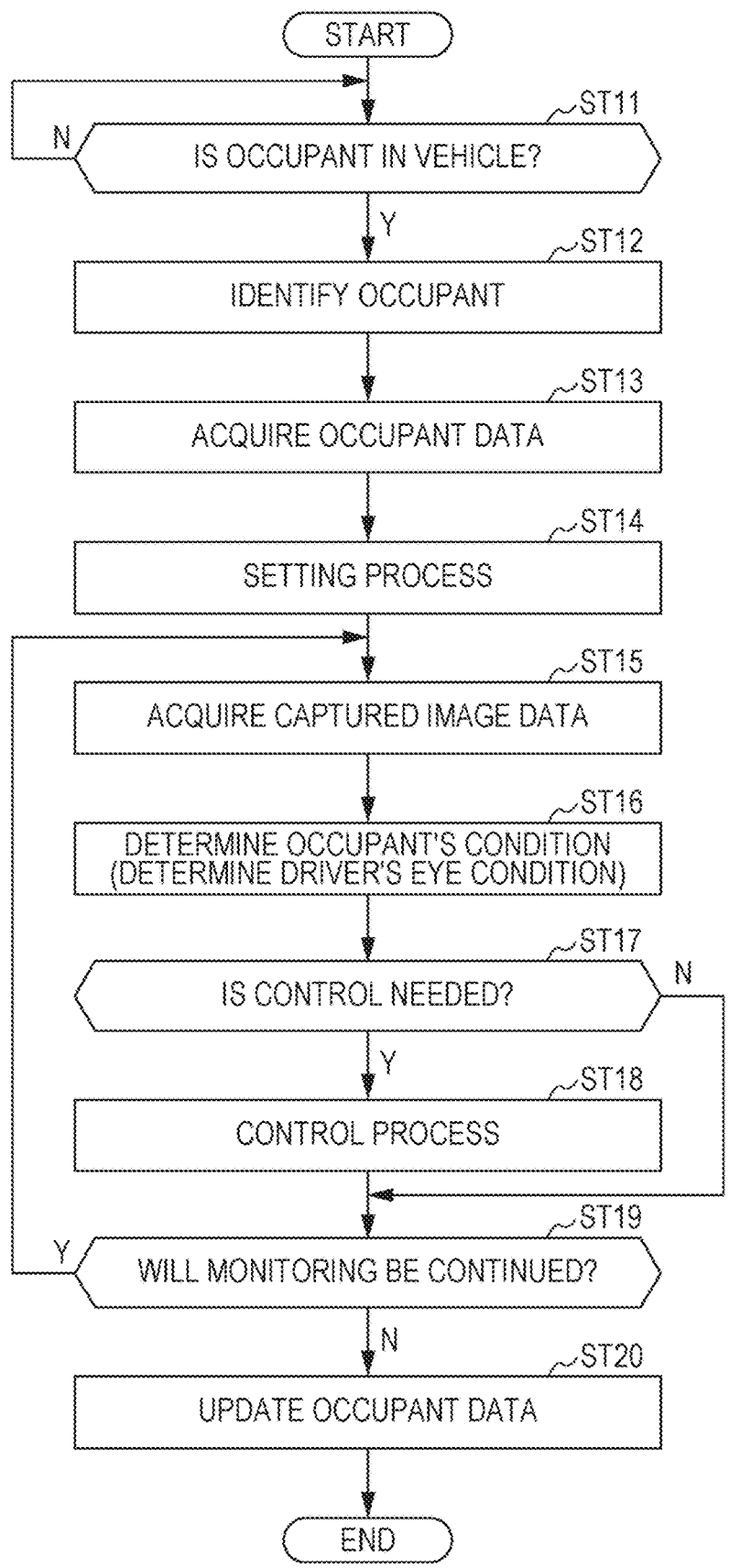

_US 11,919,454 B2_

OCCUPANT MONITORING DEVICE FOR VEHICLE

CROSS-REFERENCE TO RELATED APPLICATIONS

The present application claims priority from Japanese Patent Application Nos. 2021-027739 filed on Feb. 24, 2021, and 2022-005932 filed on Jan. 18, 2022, the entire contents of which are hereby incorporated by reference.

BACKGROUND

The disclosure relates to an occupant monitoring device for a vehicle.

Driver monitoring devices have been proposed in the field of vehicles (Japanese Unexamined Patent Application Publication (JP-A) Nos. 2019-014359 and 2019-014360).

In JP-A No. 2019-014359, a camera dedicated to a driver who drives a vehicle is provided in front of the driver to image and monitor the driver.

SUMMARY

An aspect of the disclosure provides an occupant monitoring device for a vehicle. The occupant monitoring device includes an imager, a display, and a determiner. The imager is configured to image a cabin of the vehicle to monitor conditions of occupants in the vehicle. The display is configured to display a screen to be viewed by the occupants in the vehicle. The determiner is configured to determine the conditions of the occupants in the vehicle by using captured image data obtained by imaging each of the occupants by the imager while the screen is displayed on the display. A panel configured to display the screen of the display has a non-display area on an inner side of a rectangular frame circumscribing a display area of the screen. The imager is disposed on a back of the non-display area of the panel of the display.

An aspect of the disclosure provides an occupant monitoring device for a vehicle. The occupant monitoring device includes an imager, a display, and circuitry. The imager includes an imaging sensor configured to image a cabin of the vehicle to monitor conditions of occupants in the vehicle. The display includes a panel configured to display a screen to be viewed by the occupants in the vehicle. The circuitry is configured to determine the conditions of the occupants in the vehicle by using captured image data obtained by imaging each of the occupants by the imager while the screen is displayed on the display. The panel is configured to display the screen of the display comprises a non-display area on an inner side of a rectangular frame circumscribing a display area of the screen. The imager is disposed on a back of the non-display area of the panel of the display.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 7 is a flowchart of occupant registration control to be executed by a monitoring controller in FIG. 3;

FIG. 8 is a flowchart of occupant monitoring control to be executed by the monitoring controller in FIG. 3;

DETAILED DESCRIPTION

A passenger may get in a vehicle in addition to a driver. When monitoring the passenger similarly to the driver, it is difficult to image the passenger with a dedicated camera in front of the driver.

For example, the dedicated driver monitoring device in JP-A No. 2019-014359 may be disposed at the center of the vehicle in a vehicle width direction as in JP-A No. 2019-014360.

However, there is a possibility that the camera disposed at the center of the vehicle in the vehicle width direction does not satisfactorily image the driver. Therefore, the driver monitoring function may degrade.

For example, occupant monitoring devices may be provided for individual occupants including the driver, but this is not a realistic choice from the viewpoint of costs and other factors.

There is room for further improvement to achieve satisfactory monitoring of conditions of a plurality of occupants in the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
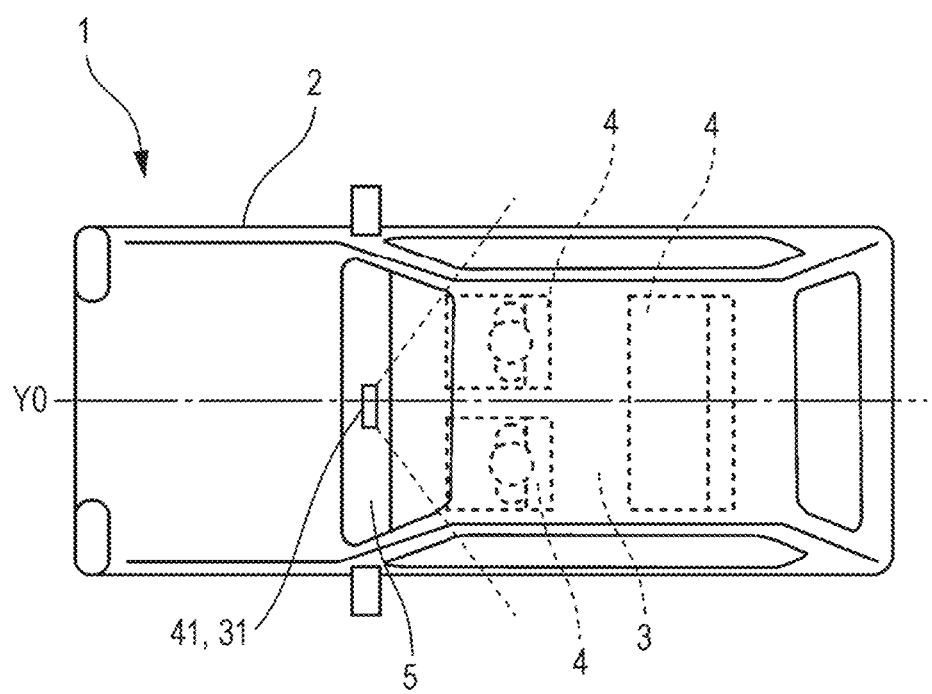
FIG. 1 is a diagram illustrating an automobile including an occupant monitoring device according to an embodiment of the disclosure.

FIG. 1 is a diagram illustrating an automobile 1 including an occupant monitoring device 15 according to the embodiment of the disclosure.

The automobile 1 is an example of a vehicle. The automobile 1 may use an internal combustion engine, battery power, or a combination thereof as a traveling power source.

In FIG. 1, a body 2 of the automobile 1 has a cabin 3. The cabin 3 includes a plurality of front seats 4 as a driver's seat and a passenger's seat, and an elongated rear seat 4. Occupants including a driver sit on the seats 4. A dashboard 5 extending along a vehicle width direction of the body 2 is provided at the front of the cabin 3 that is an area in front of the front seats 4.

Figure 2:
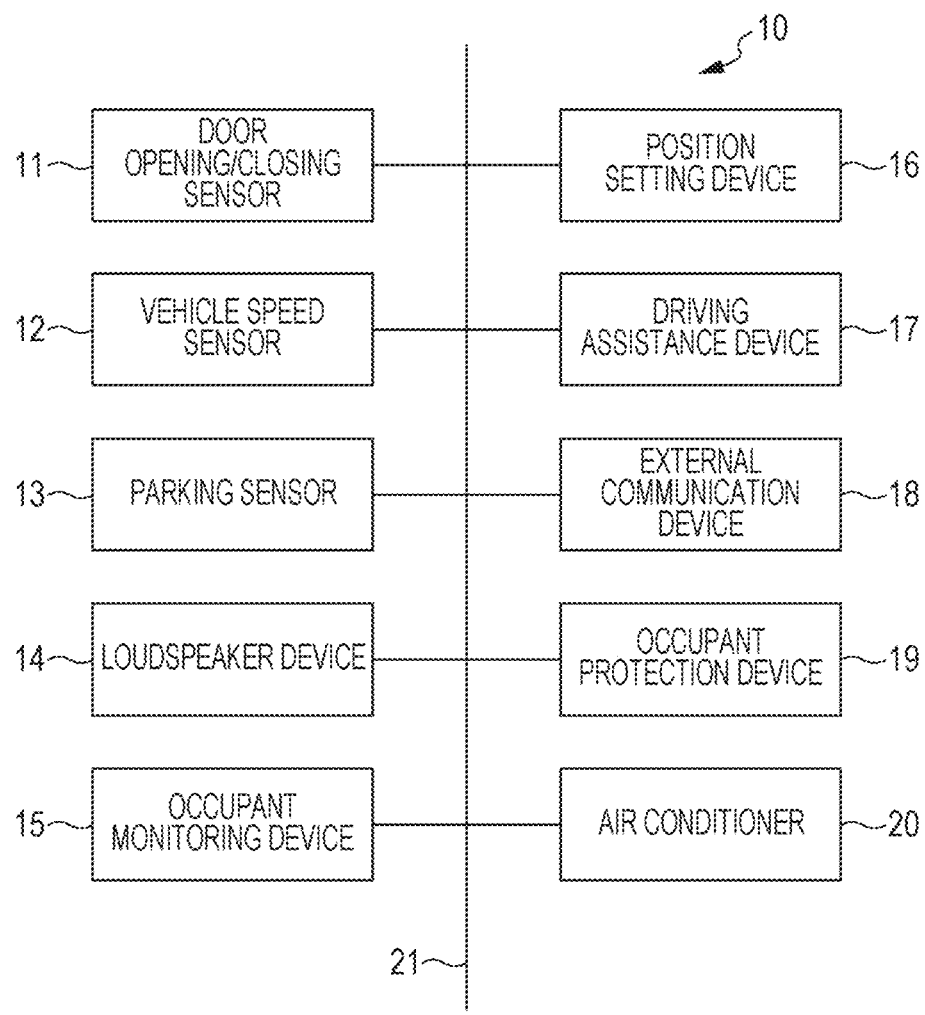
FIG. 2 is a diagram illustrating a control device of the automobile in FIG. 1.

FIG. 2 is a diagram illustrating a control device 10 of the automobile 1 in FIG. 1.

In FIG. 2, the control device 10 includes a door opening/closing sensor 11, a vehicle speed sensor 12, a parking sensor 13, a loudspeaker device 14, the occupant monitoring device 15, a position setting device 16, a driving assistance device 17, an external communication device 18, an occupant protection device 19, an air conditioner 20, and an internal network 21 that couples those devices.

The internal network 21 may be a wired communication network such as a controller area network (CAN) and a local interconnect network (LIN) for the automobile 1. The internal network 21 may be a communication network such as a LAN, or a combination of those networks. A part of the internal network 21 may be a wireless communication network.

The door opening/closing sensor 11 detects opening and closing motions of doors of the automobile 1.

The vehicle speed sensor 12 detects a speed of the traveling automobile 1. The vehicle speed sensor 12 may detect a stopped state.

The parking sensor 13 detects a parked state in which the automobile 1 remains stopped. For example, the parking sensor 13 may detect the parked state based on either one of an operation on a select lever of transmission (not illustrated) for a parking position and an operation on a parking lever (not illustrated) for a braking position.

The occupant monitoring device 15 executes a process for recognizing an occupant in the cabin 3, for example, when the door opening/closing sensor 11 detects an opening or closing motion of the door.

When the occupant monitoring device 15 recognizes a plurality of occupants, the occupant monitoring device 15 may monitor the occupants individually.

The occupant monitoring device 15 may output information on the recognized occupants and information based on the monitoring to the individual parts of the control device 10 via the internal network 21.

For example, the occupant monitoring device 15 recognizes a driver on the driver's seat 4, and monitors either one of inattentive driving and drowse of the recognized driver. When the driver is in a predetermined state, the occupant monitoring device 15 executes control to caution the driver or avoid danger. The occupant monitoring device 15 may output information on the driver, information on the caution, and information on the danger avoidance to the individual parts of the control device 10 via the internal network 21.

For example, the loudspeaker device 14 outputs voice and alert sound. The loudspeaker device 14 may output alert generated for the driver and other occupants by the occupant monitoring device 15.

For example, the position setting device 16 adjusts longitudinal and vertical positions of the seats 4, angles of back rests, longitudinal and vertical positions and an angle of a steering wheel, and longitudinal and vertical positions and angles of various pedals. The position setting device 16 changes the positions of the seats based on occupant information output from the occupant monitoring device 15.

The driving assistance device 17 assists either one of driver's manual driving operations on the automobile 1 and autonomous driving operations of the automobile 1. The driving assistance device 17 controls acceleration, deceleration, stop, and steering of the automobile 1. The driving assistance device 17 executes driving assistance depending on the driver based on driver information output from the occupant monitoring device 15.

For example, the external communication device 18 establishes wireless communication channels with a base station on a public wireless communication network, a base station on a commercial wireless communication network, and a base station for advanced traffic information, and executes data communication by using the established wireless communication channels. For example, the external communication device 18 may execute interactive data communication with a server that assists autonomous driving. The external communication device 18 may transmit information on occupants including the driver from the occupant monitoring device 15 to the server as, for example, emergency assistance information.

The occupant protection device 19 executes occupant protection control when collision of the automobile 1 is detected or predicted. For example, the occupant protection device 19 protects an occupant on the seat 4 by inflating an airbag (not illustrated) or applying tension to a seatbelt. The occupant protection device 19 may protect the occupant based on the occupant information output from the occupant monitoring device 15.

The air conditioner 20 controls a temperature and an oxygen concentration in the cabin 3. For example, the air conditioner 20 adjusts the temperature in the cabin 3 to a set temperature by supplying cooled or heated air to the cabin 3. The air conditioner 20 may condition air based on the occupant information output from the occupant monitoring device 15.

For example, the occupant can ride with comfort under the occupant's settings through the control based on the occupant information output from the occupant monitoring device 15. For example, the driver can concentrate on driving of the automobile 1.

Figure 3:
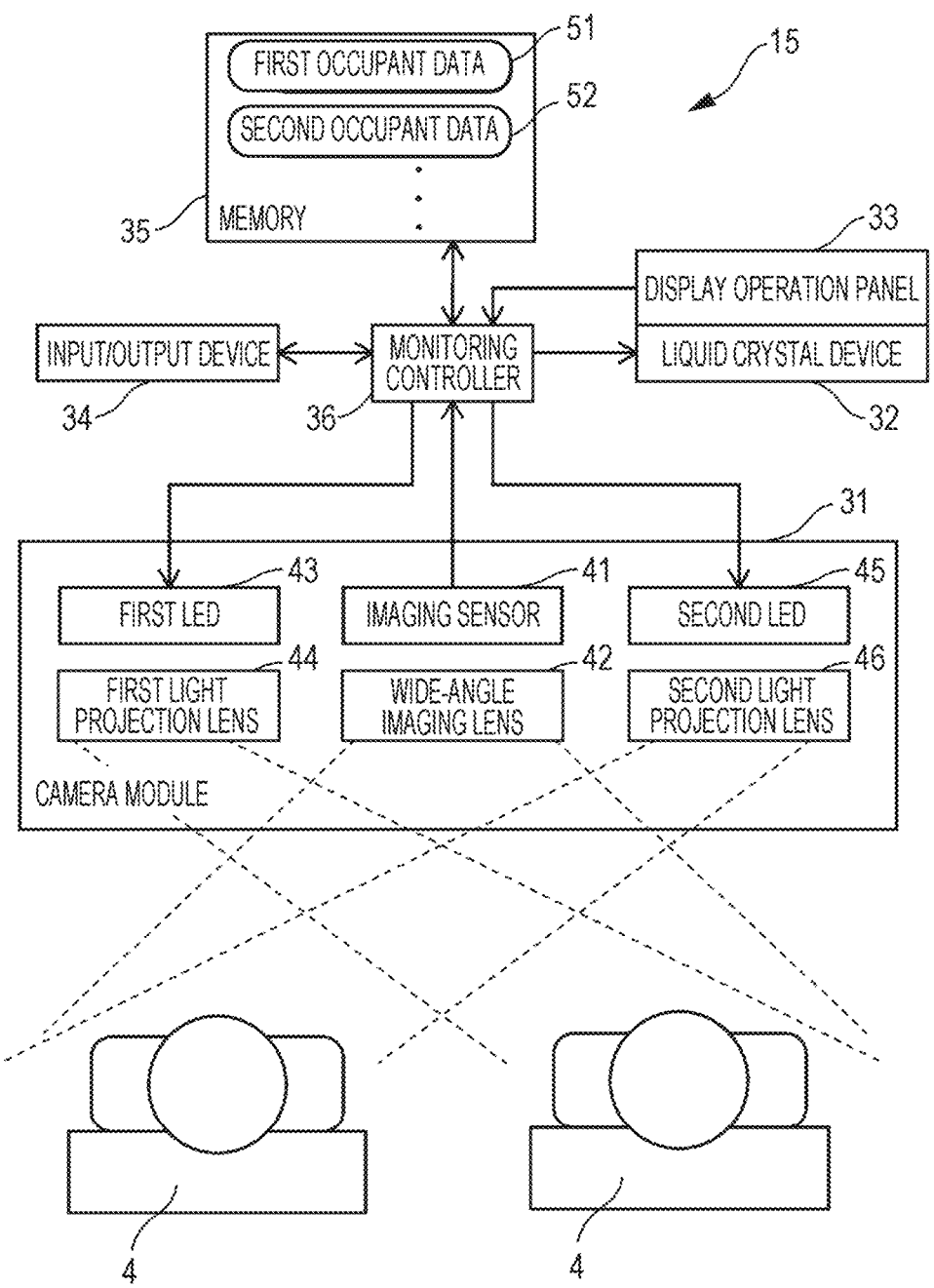
FIG. 3 is a diagram illustrating the occupant monitoring device of the automobile in FIG. 2.

FIG. 3 is a diagram illustrating the occupant monitoring device 15 of the automobile 1 in FIG. 2. In FIG. 3, the occupant monitoring device 15 monitors not only the driver but also, for example, a plurality of occupants on the front seats 4. In FIG. 3, the occupant monitoring device 15 includes a camera module 31, a liquid crystal device 32 including a display operation panel 33, an input/output device 34, a memory 35, and a monitoring controller 36 coupled to those devices.

For example, the camera module 31 may be disposed at the center of the dashboard 5 in the vehicle width direction as illustrated in FIG. 1. The camera module 31 images a plurality of occupants on the front seats 4. The camera module 31 includes an imaging sensor 41, a wide-angle imaging lens 42, a first LED 43, a first light projection lens 44, a second LED 45, and a second light projection lens 46.

The imaging sensor 41 is an optical semiconductor sensor such as a CCD or CMOS sensor. For example, the imaging sensor 41 may have a substantially quadrangular light receiving surface where a plurality of light receiving elements are arrayed. The imaging sensor 41 may output captured image data including captured images to the monitoring controller 36.

The wide-angle imaging lens 42 is laid over the imaging sensor 41. The wide-angle imaging lens 42 may be such that either one of upper bodies and heads of a plurality of occupants on the front seats 4 can be imaged with the imaging sensor 41 provided, for example, at the center of the dashboard 5 in the vehicle width direction. The wide-angle imaging lens 42 may include a plurality of optical lenses to suppress distortion at the edge of each image.

The imaging sensor 41 and the wide-angle imaging lens 42 image the cabin of the automobile 1 to monitor conditions of the occupants in the automobile 1. In one embodiment, the imaging sensor 41 and the wide-angle imaging lens 42 may serve as an "imager".

The first LED 43 and the second LED 45 may be semiconductor light emitting elements. The first LED 43 and the second LED 45 project light toward at least the driver in the automobile 1. For example, the first LED 43 and the second LED 45 may project infrared rays. In this case, the imaging sensor 41 outputs captured image data including images captured by using the infrared rays to the monitoring controller 36. The first light projection lens 44 is laid over the first LED 43. The first light projection lens 44 radiates light from the first LED 43 mainly toward the driver on the driver's seat 4. The second light projection lens 46 is laid over the second LED 45. The second light projection lens 46 radiates light from the second LED 45 mainly toward an occupant on the passenger's seat 4. The second light projection lens 46 may diffuse and project light toward the occupant on the passenger's seat 4 and the driver on the driver's seat 4. In one embodiment, the first LED 43 and the second LED 45 may serve as a "light projector".

In the camera module 31, the imaging sensor 41 and the wide-angle imaging lens 42 are disposed at the center in the vehicle width direction. The first LED 43 and the first light projection lens 44 are disposed at an end near the passenger's seat. The second LED 45 and the second light projection lens 46 are disposed at an end near the driver. Thus, the camera module 31 can capture images by projecting light without being obstructed by an object such as a steering wheel 7 between the driver and the dashboard 5.

The liquid crystal device 32 generally has a substantially quadrangular display surface. The liquid crystal device 32 displays an image on a display surface of the display operation panel 33.

In one example, the liquid crystal device 32 displays a screen to be viewed by each occupant in the automobile 1. In one embodiment, the liquid crystal device 32 may serve as a "display".

The display operation panel 33 is a transparent or semitransparent operation detection panel laid over the display surface of the liquid crystal device 32. In one embodiment, the display operation panel 33 laid over the display surface of the liquid crystal device 32 may serve as a "display". The display operation panel 33 detects an occupant's operation on the display surface of the liquid crystal device 32. The display operation panel 33 may output a point of the occupant's operation on the display surface of the liquid crystal device 32 to the monitoring controller 36.

The input/output device 34 is coupled to the internal network 21. The input/output device 34 inputs data from and outputs data to the other parts in the automobile 1 via the internal network 21.

The memory 35 stores programs and data. The memory 35 may include a non-volatile memory and a volatile memory. Examples of the non-volatile memory include an HDD, an SSD, and an EEPROM. Examples of the volatile memory include a RAM.

In the memory 35 of the occupant monitoring device 15, pieces of data on a plurality of occupants registered in the automobile 1 can be recorded while being managed for the individual occupants. FIG. 3 illustrates first occupant data 51 on a first occupant and second occupant data 52 on a second occupant. The plurality of pieces of occupant data constitute a database.

The occupant data such as the first occupant data 51 and the second occupant data 52 may include identification information unique to the occupant, registered captured image data obtained by imaging, for example, the head and eyes of the occupant by the imaging sensor 41, and various types of setting data on settings made by the occupant. For example, the setting data may include information on a position of the occupant's seat, an initial setting about ON/OFF of driving assistance, preferences on autonomous driving, a server to be used, and settings about occupant protection and air conditioning.

The memory 35 records, as registered captured image data of each occupant, captured image data obtained by imaging a frontal view of the occupant by the imaging sensor 41 while a predetermined screen is displayed on the display. In one embodiment, the memory 35 may serve as a "recorder".

The memory 35 may record occupant data about general unregistered occupants.

Examples of the monitoring controller 36 include an ECU, a CPU, and other microcomputers.

The monitoring controller 36 reads and executes a program in the memory 35. Thus, the monitoring controller 36 is implemented as a controller of the occupant monitoring device 15.

For example, the monitoring controller 36 executes a registration process and a monitoring process for an occupant in the automobile 1. The monitoring controller 36 may identify occupants in the automobile 1, and execute the monitoring process for each identified occupant.

The monitoring controller 36 determines conditions of at least the driver, such as inattentive driving, drowse, and emergency, by using his/her registered captured image data in the memory 35 as determination reference data. In one example, the monitoring controller 36 may serve as a "determiner".

The imaging sensor 41 of the camera module 31 in FIG. 3 is disposed at the center of the body 2 in the vehicle width direction to image either one of the upper bodies and the heads of a plurality of occupants on the front seats 4 as well as the driver. A passenger may get in the automobile 1 in addition to the driver.

When monitoring the passenger similarly to the driver, it is difficult to image the passenger with the dedicated imaging sensor 41 in front of the driver.

When imaging a plurality of occupants including the driver with the single imaging sensor 41, the wide-angle imaging lens 42 may be combined with the imaging sensor 41 as in the camera module 31 in FIG. 3 to increase an angle of view. When the wide-angle imaging lens 42 is laid over the imaging sensor 41, however, distortion may occur in an image of an occupant on the periphery of the image except the center.

When the driver is imaged with distortion, the eyes of the driver may also be imaged with distortion, thereby causing a possibility of a decrease in the probability of determination about drowse and inattentive driving of the occupant based on the line of sight and whether the eyes are open or closed. The driver monitoring function may degrade.

FIGS. 4A to 4D are diagrams illustrating how the driver of the automobile 1 is imaged.

Figure 4A:
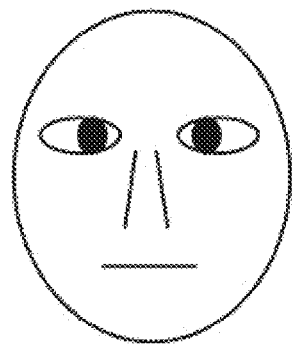
FIG. 4A is a front view of the head of a first driver who is a passenger of the vehicle.
Figure 4B:
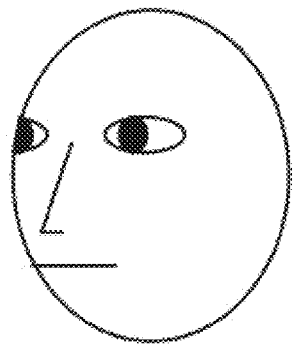
FIG. 4B B is a perspective view of the head of the first driver in FIG. 4A.

FIG. 4A is a front view of the head of a first driver. FIG. 4B is a perspective view of the head of the first driver in FIG. 4A.

When the driver faces a forward side in the automobile 1, the imaging sensor 41 provided at the center of the automobile 1 in the vehicle width direction images the head of the driver obliquely as in FIG. 4B rather than imaging a frontal view of the head as in FIG. 4A.

Figure 4C:
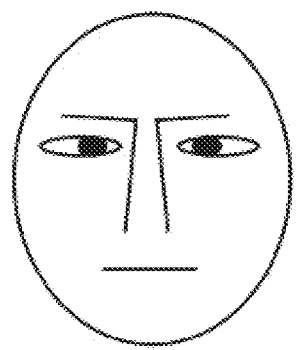
FIG. 4C is a front view of the head of a second driver who is a is a passenger of the vehicle.
Figure 4D:
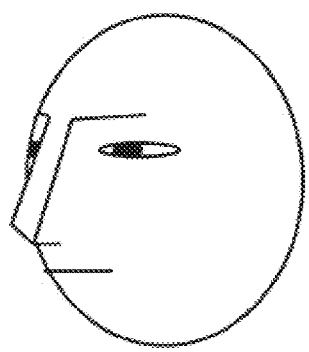
FIG. 4D is a perspective view of the head of the second driver in FIG. 4C.

FIG. 4C is a front view of the head of a second driver. FIG. 4D is a perspective view of the head of the second driver in FIG. 4C.

When the driver faces the forward side in the automobile 1, the imaging sensor 41 provided at the center of the automobile 1 in the vehicle width direction images the head of the driver obliquely as in FIG. 4D rather than imaging a frontal view of the head as in FIG. 4C.

Unlike captured image data in FIG. 4B, captured image data in FIG. 4D indicates that the right eye of the driver is hidden by the long nose of the driver and the image shows an iris.

In this case, it may be difficult for the monitoring controller 36 to determine whether the right eye of the driver is open or closed based on the captured image data in FIG. 4D. Particularly when a distorted image is captured unlike the undistorted image in FIG. 4D, it may be difficult for the monitoring controller 36 to determine whether the right eye of the driver is open or closed based on the captured image data in FIG. 4D.

Since the captured image data in FIG. 4D does not include an image component showing the white of the right eye of the driver, there is a possibility that the monitoring controller 36 cannot extract the right eye and cannot extract the head of the driver in FIG. 4D. For example, when the area of the head in the image is determined based on a positional relationship between the eyes and the nose and a positional relationship between the eyes and the mouth, there is a possibility that the monitoring controller 36 cannot determine the head of the driver based on the captured image data in FIG. 4D. Without reference data for the head of the driver, there is a possibility that the monitoring controller 36 cannot correctly estimate the absence of the right eye of the driver in the image component.

The case of FIG. 4D may easily occur when the imaging sensor 41 of the camera module 31 is provided at the center of the automobile 1 in the vehicle width direction.

As described above, the occupants have individual differences such as big eyes, small eyes, projecting eyes, and sunken eyes.

The actual position of the head of the driver may move not only in an angle-of-view direction corresponding to the vehicle width direction, but also in a vertical direction. Considering those movements, it may be difficult to correctly determine the head of the driver based on current captured image data obtained by the imaging sensor 41.

Figure 5A:
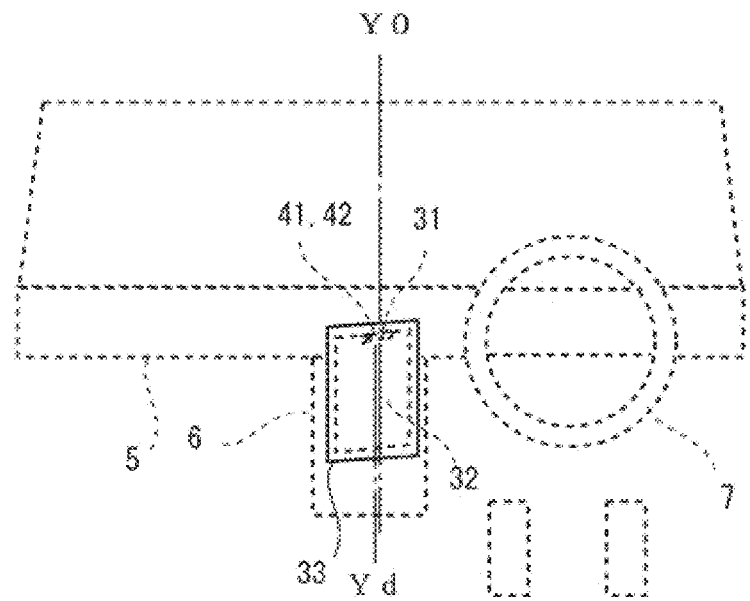
FIG. 5A is a diagram illustrating dispositions, in a cabin of the vehicle, of a liquid crystal device including a display operation panel and a camera module including an imaging sensor in FIG. 3.

FIG. 5A is a diagram illustrating internal disposition, in the cabin, of the liquid crystal device 32 including the display operation panel 33 and the camera module 31 including the imaging sensor 41 in FIG. 3 according to this embodiment.

FIG. 5A illustrates the dashboard 5 and a center console 6 at the front of the cabin 3.

The liquid crystal device 32 including the display operation panel 33 is disposed in a vertically oriented posture at the center of the body 2 in the vehicle width direction to extend from the dashboard 5 to the center console 6.

For example, at the center of the body 2 in the vehicle width direction, the liquid crystal device 32 including the display operation panel 33 is disposed at a position slightly shifted away from the driver toward the passenger opposite to the driver relative to a center position Y0 of the body 2 in the vehicle width direction. At the center of the body 2 in the vehicle width direction, the liquid crystal device 32 including the display operation panel 33 at the shifted position is inclined at an angle relative to the vehicle width direction. At the shifted position, the liquid crystal device 32 including the display operation panel 33 is inclined toward the driver relative to a longitudinal direction of the body 2. Since the liquid crystal device 32 including the display operation panel 33 is slightly shifted away from the driver toward the opposite side, the passenger may have an operability similar to that in the case of center disposition though the liquid crystal device 32 is inclined toward the driver.

Figure 6A:
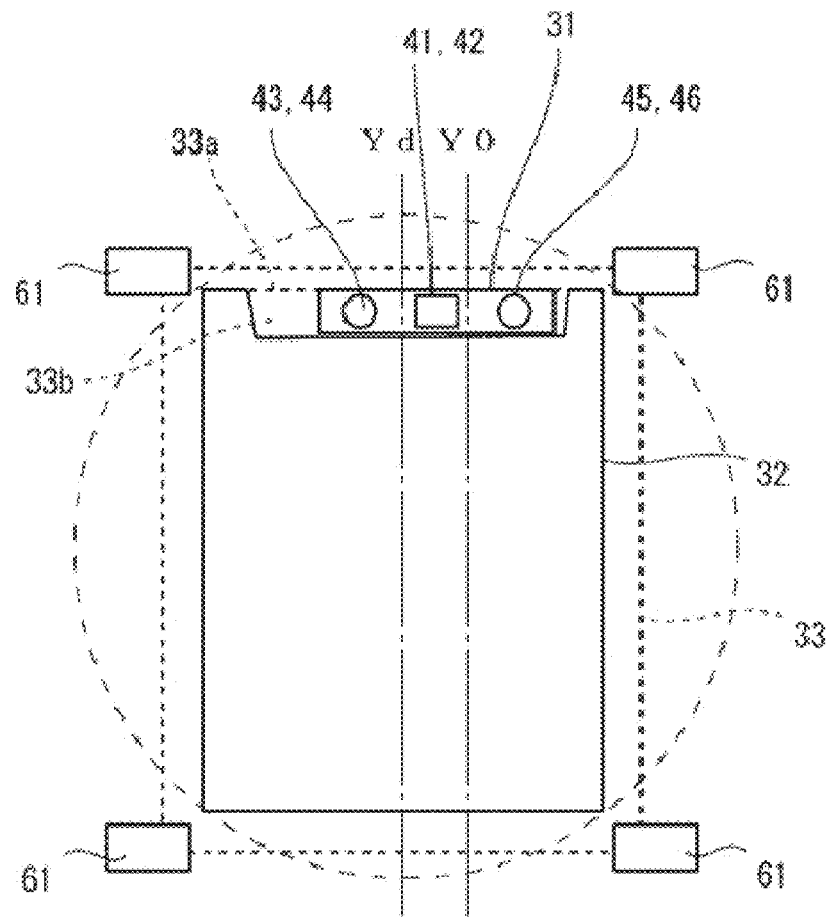
FIG. 6A is a diagram illustrating the display operation panel of the liquid crystal device provided at a shifted position in the center of a body in a vehicle width direction.
Figure 6B:
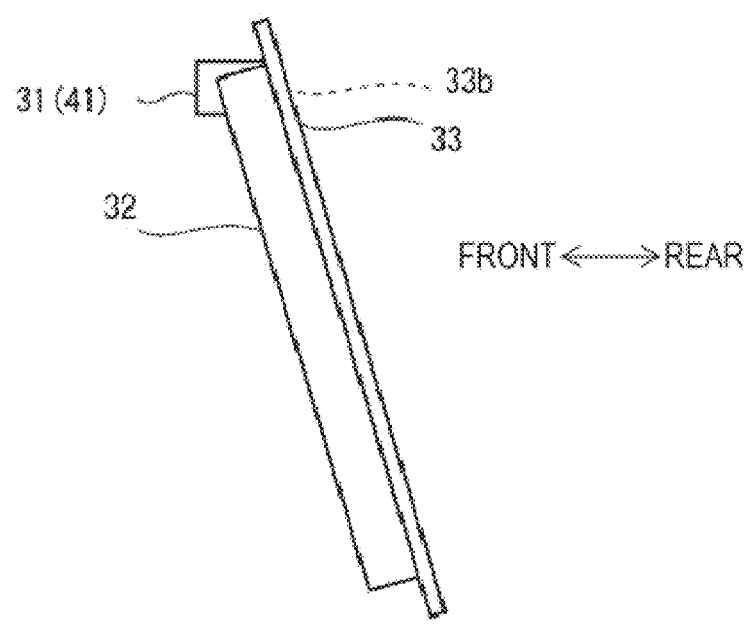
FIG. 6B is a side view of the display operation panel in the vehicle width direction of a body of the vehicle.

FIGS. 6A and 6B are diagrams illustrating the display operation panel 33 of the liquid crystal device 32 provided at the shifted position in the center of the body 2 in the vehicle width direction. FIG. 6A is a front view from the cabin 3.

FIG. 6B is a side view in the vehicle width direction of the body 2. In FIG. 6A, a center position Yd of the display operation panel 33 of the liquid crystal device 32 is shifted toward the passenger, that is, leftward in FIG. 6A relative to the center position Y0 of the body 2 in the vehicle width direction.

The liquid crystal device 32 including the display operation panel 33 and the camera module 31 are shifted from the center position Y0 of the body 2 in the vehicle width direction. The liquid crystal device 32 including the display operation panel is retained by resin retainers 61 at four corners of the peripheral edge of the display operation panel 33.

The display surface of the liquid crystal device 32 serving as a screen display area is not quadrangular but is substantially recessed by cutting out the center of the upper edge of the quadrangle unlike general monitors. A non-display area 33b that is a cutout portion is present on an inner side of a rectangular frame 33a circumscribing the substantially recessed display area of the liquid crystal device 32. The display area of the liquid crystal device 32 is present at the right and left across the non-display area 33b. The non-display area 33b is axially symmetrical across the center position Yd of the display operation panel 33 of the liquid crystal device 32.

As described above, the non-display area 33b is the cutout portion at the center of the upper edge of the screen display area on the inner side of the rectangular frame 33a circumscribing the display area on the display operation panel 33 that displays the screen of the liquid crystal device 32. On the display operation panel 33, the non-display area 33b is a cutout portion along the upper edge of the screen display area. On the display operation panel 33, the non-display area 33b is present at least in a range from the center position Yd of the screen display area in the vehicle width direction to the center position Y0 of the automobile 1 in the vehicle width direction. On the display operation panel 33, the non-display area 33b is bilaterally symmetrical in the vehicle width direction of the automobile 1 across the center position Yd of the screen display area in the vehicle width direction.

On the back of the display operation panel 33, the camera module 31 including the imaging sensor 41 is disposed on the back of the non-display area 33b above the display area of the liquid crystal device 32. For example, the camera module 31 is provided so that the imaging sensor 41 and the wide-angle imaging lens 42 are positioned between the center position Yd of the display operation panel 33 of the liquid crystal device 32 and the center position Y0 of the body 2 in the vehicle width direction. Therefore, the center positions of the imaging sensor and the wide-angle imaging lens 42 in the vehicle width direction are between the center position Yd of the display operation panel 33 of the liquid crystal device 32 and the center position Y0 of the body 2 in the vehicle width direction. The imaging sensor 41 and the wide-angle imaging lens 42 are disposed at a position slightly shifted away from the driver toward the opposite side relative to the center position Y0 of the body 2 in the vehicle width direction while being inclined toward the driver relative to the longitudinal direction of the body 2 similarly to the display operation panel 33.

The first LED 43 and the second LED 45 of the camera module 31 are disposed on the back of the non-display area 33b together with the imaging sensor 41.

When the camera module 31 is provided on the back of the display operation panel 33, the wide-angle imaging lens 42, the first light projection lens 44, and the second light projection lens 46 may be provided by processing the display operation panel 33.

Figure 5B:
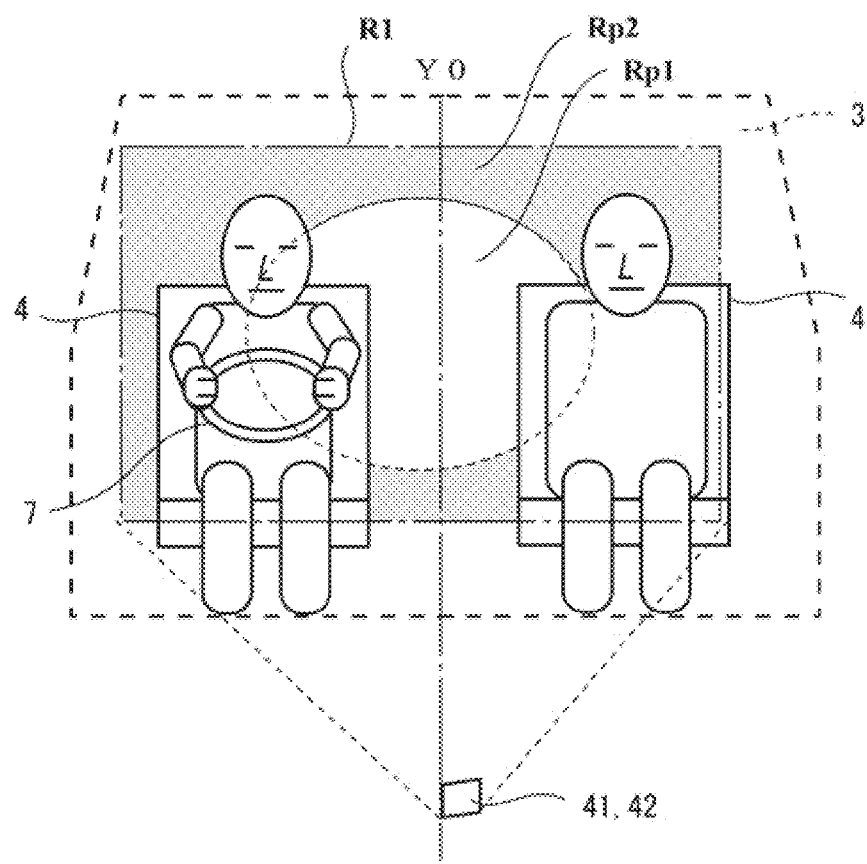
FIG. 5B is a diagram illustrating a cabin imaging range of the camera module including the imaging sensor and a wide-angle imaging lens.

FIG. 5B is a diagram illustrating a imaging range R1 of the cabin by the camera module 31. The camera module 31 includes the imaging sensor 41 and the wide-angle imaging lens 42 and inclined at the shifted position in the center of the automobile 1 in the vehicle width direction.

The wide-angle imaging lens 42 is laid over the imaging sensor 41. Thus, the imaging sensor 41 can image the entire cabin 3 as in the imaging range R1 illustrated in FIG. 5B. The imaging sensor 41 is disposed at the center of the automobile 1 in the vehicle width direction, and can image the head of the driver and the head of the passenger on the front seats 4.

When the wide-angle imaging lens 42 is combined with the imaging sensor 41 to image a plurality of occupants, an image at the center of the imaging range R1 corresponds to a high image quality area Rp1 with less distortion, and an image at the edge of the imaging range R1 corresponds to a distortion area Rp2 with more distortion than at the center. When the occupant is seated near the right or left end in the vehicle width direction, it may be difficult to image the head of the occupant without distortion. When determination is made based on, for example, whether the eyes of the occupant are open or closed, there is a possibility that the determination cannot be made correctly.

In this embodiment, the display operation panel 33 is inclined toward the driver relative to the longitudinal direction of the body 2. The imaging sensor 41 and the wide-angle imaging lens 42 on the back of the display operation panel 33 are provided at the shifted position opposite to the driver relative to the center position Y0 of the body 2 in the vehicle width direction. Thus, the high image quality area Rp1 at the center of the image captured by the imaging sensor 41 is shifted toward the driver. The imaging sensor 41 is likely to image the driver in the high image quality area Rp1 at the center of the captured image rather than the distortion area Rp2 on the periphery. It is expected that the driver can be imaged with less distortion.

On the back of the non-display area 33b of the display operation panel 33 above the liquid crystal device 32, the camera module 31 is provided at the position shifted from the center position Y0 in the vehicle width direction. The liquid crystal device 32 including the display operation panel 33 may be provided in a rearwardly inclined posture along inclination of an interior surface extending from the dashboard 5 to the center console 6. Similarly to the liquid crystal device 32 including the display operation panel 33, the camera module 31 is inclined toward the driver relative to the longitudinal direction of the body 2, and is provided in a rearwardly inclined posture.

The camera module 31 is provided on an inner side of the retainers 61 that retain the four corners of the display operation panel 33 without projecting outward beyond the retainers 61. As illustrated with a dashed circle in FIG. 6A, the camera module 31 is disposed such that the imaging sensor 41, the first LED 43, and the second LED 45 are disposed within a circumscribed circle of an image display area.

Through the limited disposition described above, the center position of the image captured by the imaging sensor 41 of the camera module 31 in the vehicle width direction is between the center position Yd of the image display area of the liquid crystal device 32 including the display operation panel 33 and the center position Y0 of the body 2 in the vehicle width direction.

The imaging sensor 41 of the camera module 31 disposed on the inner side of the retainers 61 appears to be provided on the liquid crystal device 32. As a result, the imaging sensor 41 of the camera module 31 images the occupant from the back of the liquid crystal device 32 including the display operation panel 33. On the back of the display operation panel 33, the imaging sensor 41 of the camera module 31 is shifted from the center position Yd of the screen display area in the vehicle width direction toward the center position Y0 of the automobile 1 in the vehicle width direction so that the imaging sensor 41 is positioned within the range from the center position Yd of the screen display area in the vehicle width direction to the center position Y0 of the automobile 1 in the vehicle width direction.

FIG. 7 is a flowchart of occupant registration control to be executed by the monitoring controller 36 in FIG. 3.

The monitoring controller 36 may repeat the registration control in FIG. 7 when a new occupant gets into the automobile 1.

In Step ST1, the monitoring controller 36 first determines whether an occupant will be registered.

For example, the monitoring controller 36 determines that an occupant will be registered when the occupant has operated an occupant registration button on a menu screen displayed on the liquid crystal device 32. Then, the monitoring controller 36 advances the process to Step ST2. In the other case, the monitoring controller 36 determines that no occupant will be registered, and terminates the registration control in FIG. 7.

In Step ST2, the monitoring controller 36 executes the registration process for the new occupant. The monitoring controller 36 first causes the liquid crystal device 32 to display occupant registration start guidance. The occupant who is going to register the occupant by operating the occupant registration button on the menu screen may be viewing the displayed guidance while facing the liquid crystal device 32. With the guidance, the monitoring controller 36 may instruct the occupant to bring his/her face to a position in front of the liquid crystal device 32. The monitoring controller 36 turns ON the first LED 43 and the second LED 45 of the camera module 31. Thus, infrared rays are radiated onto either one of the upper body and the head of the occupant facing the liquid crystal device 32 to view the displayed guidance.

In Step ST3, the monitoring controller 36 acquires current captured image data from the imaging sensor 41, and acquires, as a frontal image, an image component in the captured image data showing a frontal view of the occupant to be newly registered. When a plurality of occupants can be extracted from the image captured by the imaging sensor 41, the monitoring controller 36 may prompt the occupant to select one of the occupants. The frontal image is expected to include infrared image components of the eyes, nose, and mouth of the occupant with high probability. The infrared image components may include vein patterns of the head and eyeballs. Depending on the number of extracted features, the vein patterns of the head and eyeballs can be used for identifying individuals. The vein patterns of the head and eyeballs are hardly affected by a light and dark pattern caused by either one of the shape of the surface of the head and the bumps and dips and the shape of the face. The vein pattern of the eyeball may extend from the white of the eye on the periphery to the iris at the center. A vein pattern of the eyelid that covers the eyeball differs from the vein pattern of the eyeball. The monitoring controller 36 may extract information on the vein patterns of the head, eyeballs, and eyelids from the captured image data. The image component showing the frontal view of the head of the occupant is expected to include the image components of the parts of the head with high image quality.

The monitoring controller 36 may repeat either one of the guidance and the acquisition of the current captured image data from the imaging sensor 41 until the monitoring controller 36 determines that the frontal image includes the infrared image components of the eyes, nose, and mouth of the occupant.

In Step ST4, the monitoring controller 36 causes the liquid crystal device 32 to display forward viewing guidance that prompts the occupant to view the forward side in the automobile 1. The occupant may view the forward side in the automobile 1 based on the guidance displayed on the liquid crystal device 32. The monitoring controller 36 turns ON the first LED 43 and the second LED 45 of the camera module 31. Thus, infrared rays are radiated onto either one of the upper body and the head of the occupant viewing the forward side in the automobile 1.

In Step ST5, the monitoring controller 36 acquires current captured image data from the imaging sensor 41, and acquires, as a forward viewing image, an image component in the captured image data showing the occupant viewing the forward side. The forward viewing image may include infrared image components of the eyes, nose, and mouth of the occupant at angles different from those in the frontal image. If the angle in capturing the occupant changes, the relative disposition (the distance between the eyes, for example) in the captured image changes. The forward viewing image obtained by using the infrared rays may include the vein patterns of the head and eyeballs of the occupant viewing the forward side. The monitoring controller 36 may extract information on the vein patterns of the head, eyeballs, and eyelids from the captured image data.

The image component showing the head of the occupant viewing the forward side is expected to include, with high image quality, the image components of the parts of the head of the occupant viewing the forward side without drowse and inattentive driving. The image components of the parts of the head of the occupant viewing the forward side are appropriately associated with the image components of the parts of the head in the frontal view. For example, when there is an image of the head of a drowsing occupant viewing the forward side, image components of parts of the head of the drowsing occupant in a frontal view can be obtained by executing a process similar to that in a case where image components of the parts of the head of the occupant viewing the forward side without drowse and inattentive driving are converted into image components of the parts of the head in the frontal view. The image components of the parts of the head in the frontal view may indicate with high probability that the occupant is drowsing. This process can reduce the possibility of determination that the occupant is not drowsing in a case of a process executed uniformly irrespective of features of the occupant.

In Step ST6, the monitoring controller 36 executes a user registration process.

In the user registration process, the monitoring controller records the two captured occupant images as registered captured image data together with identification information unique to the occupant. Thus, the memory 35 records occupant data including the registered captured image data of the new occupant. The memory 35 records, as captured image data of each occupant, captured image data obtained by imaging the occupant by the imaging sensor 41 while the predetermined screen is displayed on the liquid crystal device 32. The registered captured image data recorded in the memory 35 for the occupant includes the frontal image and the forward viewing image of the occupant.

FIG. 8 is a flowchart of occupant monitoring control to be executed by the monitoring controller 36 in FIG. 3.

For example, the monitoring controller 36 may repeat the monitoring control in FIG. 8 in a period in which the occupant is riding the automobile 1.

In Step ST11, the monitoring controller 36 determines whether an occupant is in the automobile 1. For example, the monitoring controller 36 may determine whether an occupant is in the automobile 1 based on either one of an image obtained by the imaging sensor 41 and detection of door opening or closing by the door opening/closing sensor 11. When an occupant is in the automobile 1, the monitoring controller 36 advances the process to Step ST12. When no occupant is in the automobile 1, the monitoring controller 36 repeats this process. When no occupant is in the automobile 1, the monitoring controller 36 may terminate the monitoring control in FIG. 8.

In Step ST12, the monitoring controller 36 starts the monitoring process for the riding occupant.

The monitoring controller 36 first identifies the riding occupant.

The monitoring controller 36 acquires a new captured image from the imaging sensor 41, extracts an image component of the riding occupant, and compares the image component with a plurality of pieces of occupant data registered in the memory 35.

At this time, the monitoring controller 36 may make the comparison based on forward viewing image components in the pieces of registered captured image data of occupants in the memory 35. The forward viewing image tends to include salient features of, for example, the nose of the face based on bumps and dips. Even through the comparison based on the forward viewing image components, a match of the occupant can be determined with high accuracy. The monitoring controller 36 may compare the features extracted from the images instead of directly comparing the images.

When the registered captured image data in any occupant data registered in the memory 35 has a match at a predetermined probability or higher, the monitoring controller 36 may determine that the riding occupant is an occupant of the registered captured image data.

In this case, the monitoring controller 36 identifies the riding occupant as an occupant identified through the comparison with the plurality of pieces of occupant data registered in the memory 35.

When the registered captured image data having a match at the predetermined probability or higher is not present in the plurality of pieces of occupant data registered in the memory 35, the monitoring controller 36 may identify the riding occupant as an unregistered occupant.

In Step ST13, the monitoring controller 36 acquires the occupant data of the identified occupant.

In Step ST14, the monitoring controller 36 executes a setting process by using the acquired occupant data. When the occupant data includes various types of setting data on settings made by the occupant, the monitoring controller 36 executes the setting process based on the setting data. The monitoring controller 36 outputs information on the setting data to the individual parts of the automobile 1. Thus, processes are executed on, for example, a position of the occupant's seat, an initial setting about ON/OFF of driving assistance, preferences on autonomous driving, a server to be used, and settings about occupant protection and air conditioning.

For example, the monitoring controller 36 determines whether a child bucket seat is set on the passenger's seat 4 based on the acquired latest captured image data. When the child bucket seat is set, the monitoring controller 36 makes a setting for prohibiting inflation of the airbag toward the passenger's seat 4.

In Step ST15, the monitoring controller 36 starts the monitoring process for the identified occupant. The monitoring controller 36 first acquires the latest captured image data from the imaging sensor 41.

In Step ST16, the monitoring controller 36 determines image components of the upper body and the head of the occupant in the latest captured image data. The monitoring controller 36 determines the image components of the upper body and the head of the identified occupant in the latest captured image data by using, as a reference, image components in the registered captured image data of the occupant in the memory 35. For example, the monitoring controller 36 may estimate a frontal image of the occupant in the current captured image data obtained by the imaging sensor 41 based on a difference between a frontal image and a forward viewing image of the occupant registered in the memory 35, and determine conditions of the occupant in the automobile 1 based on the image components in the estimated frontal image of the occupant. For example, the monitoring controller 36 may correct lens distortion and direction of the occupant image in the current captured image data by using the registered frontal image of the occupant, and estimate the frontal image of the occupant in the current captured image data. When the registered captured image data is not found, the monitoring controller 36 may determine the image components of the upper body and the head of the occupant in the latest captured image data by using, as a reference, image components in standard registered captured image data in the memory 35.

Examples of the conditions of the occupant to be determined by the monitoring controller 36 in the latest captured image data include a direction of the head, a direction of the line of sight, and whether the eyes are open or closed. The monitoring controller 36 may determine pulsation in a vein. For example, when the eyes of the driver are closed, the direction of the line of sight is not the forward direction, the direction of the head is not the forward direction, or the pulsation is high, the monitoring controller 36 determines that the driver is not in a state appropriate for driving. In the other cases, the monitoring controller 36 may determine that the driver is in the state appropriate for driving.

The monitoring controller 36 determines the conditions of the occupant in the automobile 1 by using the registered captured image data recorded in the memory 35 as the reference data.

The monitoring controller 36 determines at least one of the line of sight of the driver or whether the eyes of the driver are open or closed as the conditions of the driver in the automobile 1. Since the registered captured image data having high image quality can be used as the reference, the monitoring controller 36 can acquire not only the information on whether the eyes are open or closed but also, depending on the occupant, information on a change in the imaging condition of either one of the iris and the white of the eye between the top and bottom eyelids. Thus, an eye expression such as the direction of the line of sight of the occupant can be determined with high accuracy.

If similar determination is attempted without using the registered captured image data of each occupant, the eye expression such as the direction of the line of sight of the occupant is determined, including individual differences such as the size of the eyes. It may be difficult to determine the eye expression of each individual with high accuracy. Excessive alert may be output based on the body feature of the occupant. The occupant may become uncomfortable.

In Step ST17, the monitoring controller 36 determines whether control on, for example, traveling of the automobile 1 is needed based on a result of the determination of the conditions of the occupant such as the driver. For example, when determination is made that the driver is not in the state appropriate for driving, the monitoring controller 36 determines that the control is needed, and advances the process to Step ST18. In the other cases, for example, when all the occupants including the driver are in a state appropriate for traveling, the monitoring controller 36 determines that the control is not needed, and advances the process to Step ST19 while skipping Step ST18.

In Step ST18, the monitoring controller 36 controls, for example, the traveling of the automobile 1.

For example, when determination is made that the direction of the line of sight of the driver is not the forward direction or the direction of the head is not the forward direction, the monitoring controller 36 alerts the driver. For example, the driver may be alerted by displaying alert on the liquid crystal device 32 or outputting alert sound from the loudspeaker device 14. When determination is made that the driver does not view the forward side, that is, the line of sight of the driver is not yet the forward direction though the alert is output, the monitoring controller 36 switches the traveling mode of the automobile 1 to the autonomous driving to decelerate or stop the traveling of the automobile 1. When decelerating or stopping the traveling of the automobile 1, the monitoring controller 36 may turn ON a hazard warning signal lamp (not illustrated) or transmit emergency information by the external communication device 18.

For example, when determination is made that the driver is drowsing or the pulsation is high, the monitoring controller 36 alerts the driver or decelerates or stops the traveling of the automobile 1. When decelerating or stopping the traveling of the automobile 1, the monitoring controller 36 may turn ON the hazard warning signal lamp (not illustrated) or transmit the emergency information by the external communication device 18.

When the driver is continuously driving for a predetermined period or longer, the eyes are opened and closed at a predetermined frequency, or the head tends to bend downward, the monitoring controller 36 may determine in Step ST17 that the control is needed, and prompt the driver to, for example, take a rest.

In Step ST19, the monitoring controller 36 determines whether to continue the occupant monitoring control. For example, the monitoring controller 36 may determine whether the occupant gets out of the automobile 1 based on either one of an image obtained by the imaging sensor 41 and detection of door opening or closing by the door opening/closing sensor 11. When the occupant gets out of the automobile 1, the monitoring controller 36 determines not to continue the occupant monitoring control, and advances the process to Step ST20. In the other cases, the monitoring controller 36 determines to continue the occupant monitoring control, and returns the process to Step ST15. The monitoring controller 36 repeats the process from Step ST15 to Step ST19 until the monitoring controller 36 determines not to continue the occupant monitoring control.

In Step ST20, the monitoring controller 36 updates the occupant data registered in the memory 35 as data of the recognized occupant in a process when the occupant gets out of the automobile 1. When the occupant gets out of the automobile 1, the monitoring controller 36 acquires setting information from the individual parts of the automobile 1, and updates the occupant data registered in the memory 35. Thus, the occupant data registered in the memory 35 reflects the occupant's preferences. When the occupant gets in the automobile 1 next time, the latest occupant's settings are made automatically.

The monitoring controller 36 may temporarily record occupant data of an unregistered occupant in the memory 35. When the occupant performs the registration operation later on, the settings can be linked immediately.

As described above, the occupant monitoring device 15 of this embodiment includes the imaging sensor 41 that images the cabin of the automobile 1 to monitor conditions of a plurality of occupants in the automobile 1, the liquid crystal device 32 that displays the screen to be viewed by each occupant in the automobile 1, the memory 35 that records, as registered captured image data of each occupant, captured image data obtained by imaging the occupant by the imaging sensor 41 while the predetermined screen is displayed on the liquid crystal device 32, and the determiner that determines the conditions of each occupant in the automobile 1 by using the registered captured image data recorded in the memory 35 as the reference data. In this embodiment, the registered captured image data obtained by imaging each occupant by the imaging sensor 41 while the predetermined screen is displayed on the liquid crystal device is used as the reference data together with the current captured image data obtained by the imaging sensor 41 to determine the conditions of the occupant in the automobile 1. Thus, the conditions of each occupant in the automobile 1 can be determined with higher probability by suppressing the effects of, for example, the body feature of the occupant and the position in the angle-of-view direction in the captured image data of the occupant in the automobile 1.

For example, if the conditions of each occupant in the automobile 1 are determined based on the current captured image data obtained by the imaging sensor 41, there is a possibility that the conditions of the occupant cannot correctly be determined due to the effects of, for example, the body feature of the occupant and the position in the angle-of-view direction in the captured image data of the occupant in the automobile 1. In this embodiment, the registered captured image data obtained by imaging each occupant by the imaging sensor 41 while the predetermined screen is displayed on the liquid crystal device 32 is used as the reference data. Thus, the conditions of each occupant can be determined with higher probability by suppressing those effects.

Particularly in this embodiment, the imaging sensor 41 is disposed on the back of the display operation panel 33 that displays the screen and on the back of the non-display area 33b provided on the inner side of the rectangular frame 33a circumscribing the screen display area. Therefore, the imaging sensor 41 may capture an image equivalent to an image captured from behind the screen displayed on the liquid crystal device 32. The imaging sensor 41 may capture a frontal image of the head of each occupant viewing the screen. When the registered captured image data indicating the frontal image of the head of each occupant is used as the reference data, the conditions of the occupant in the current captured image data obtained by the imaging sensor 41 can be determined with higher probability.

In this embodiment, the display operation panel 33 of the liquid crystal device 32 and the imaging sensor 41 are disposed at the center of the automobile 1 in the vehicle width direction while being shifted from the center. The imaging sensor 41 has the wide-angle imaging lens 42 at the angle of view at which the heads of the plurality of occupants seated in the front row of the automobile 1 can be imaged while being disposed at the center of the automobile 1 in the vehicle width direction. The determiner determines at least one of the line of sight of the driver or whether the eyes of the driver are open or closed as the conditions of the plurality of occupants in the automobile 1. In this case, the conditions of the plurality of occupants including the driver in the automobile 1 can be determined with higher probability.

Particularly in this embodiment, the display operation panel 33 that displays the screen of the liquid crystal device has the non-display area 33b on the inner side of the rectangular frame 33a circumscribing the screen display area. The non-display area 33b is the cutout portion at the center of the upper edge of the screen display area along the upper edge on the display operation panel 33. On the display operation panel 33, the non-display area 33b is provided at least in the range from the center of the screen display area in the vehicle width direction to the center of the automobile 1 in the vehicle width direction, and is bilaterally symmetrical in the vehicle width direction of the automobile 1 across the center of the screen display area in the vehicle width direction. On the back of the display operation panel 33 of the liquid crystal device 32, the imaging sensor 41 is shifted from the center of the screen display area in the vehicle width direction toward the center of the automobile 1 in the vehicle width direction so that the imaging sensor 41 is positioned within the range from the center of the screen display area in the vehicle width direction to the center of the automobile 1 in the vehicle width direction. Therefore, the field of view of the imaging sensor is not obstructed the display area of the liquid crystal device 32. Further, the imaging sensor 41 can image the heads of a plurality of occupants seated in the front row of the automobile 1 from the center of the automobile 1 even though the display operation panel 33 of the liquid crystal device 32 is disposed at the center of the automobile 1 in the vehicle width direction while being shifted from the center. Irrespective of whether the occupant is seated on the right side or the left side of the automobile 1 in the vehicle width direction, the occupant can be imaged under the same condition. The conditions of the occupant can be determined with higher probability irrespective of the difference in the seating position of the occupant.

Since the non-display area 33b of the display operation panel 33 that displays the screen of the liquid crystal device 32 is bilaterally symmetrical in the vehicle width direction of the automobile 1 across the center of the screen display area in the vehicle width direction, the shape of the displayed screen can be made bilaterally symmetrical to have stability.

The embodiment described above is an exemplary embodiment of the disclosure, but the embodiment of the disclosure is not limited to this embodiment, and various modifications and changes may be made without departing from the gist of the disclosure.

In the embodiment described above, the liquid crystal device 32 is disposed in the vertically oriented posture.

For example, the liquid crystal device 32 may be disposed in a horizontally oriented posture.

Figure 9:
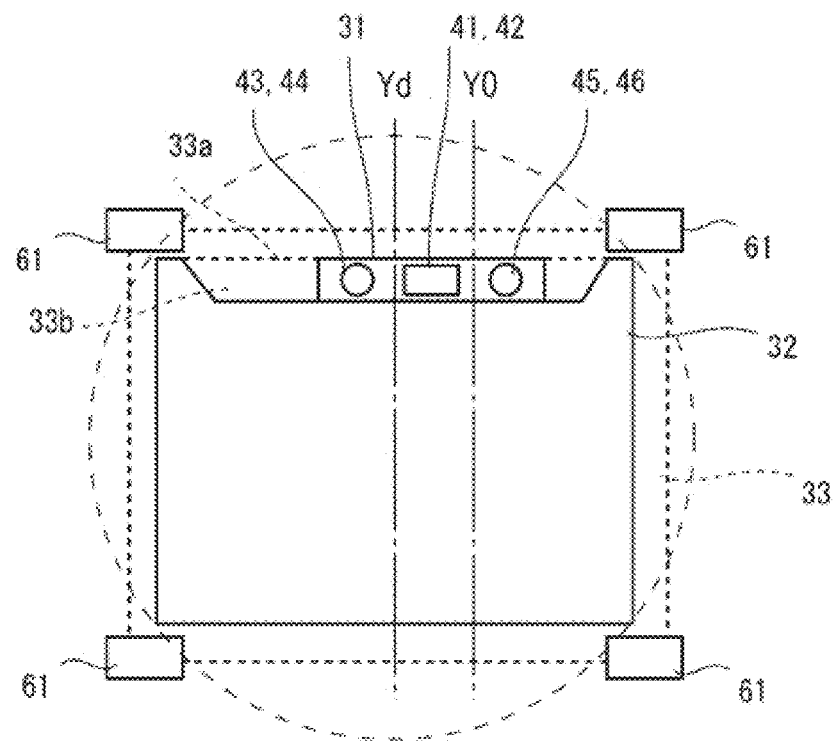
FIG. 9 is a diagram illustrating disposition of the camera module including the imaging sensor relative to the display operation panel of the liquid crystal device according to a modified example of FIG. 6A.

FIG. 9 is a diagram illustrating disposition of the camera module 31 including the imaging sensor 41 relative to the display operation panel 33 of the liquid crystal device 32 according to a modified example of FIG. 6A.

Also in this case, the image display area of the liquid crystal device 32 is shifted toward the passenger side, and at least the center position of the imaging sensor 41 on the back of the display operation panel 33 of the liquid crystal device 32 is between the center position Yd of the display area and the center position Y0 of the body 2 in the vehicle width direction. Therefore, the imaging sensor 41 may capture an image equivalent to an image captured from behind the screen displayed on the liquid crystal device 32. Thus, it is possible to attain effects equivalent to those of the embodiment described above.

In the disposition described above, either one of the imaging sensor 41 and the camera module 31 is provided on the inner side of the retainers 61 that retain the peripheral edge of the display operation panel 33 of the liquid crystal device without projecting outward beyond the retainers 61. The imaging sensor 41, the first LED 43, and the second LED 45 of the camera module 31 are disposed within a circumscribed circle of an image display area (dashed circle in the drawing).

Figure 10:
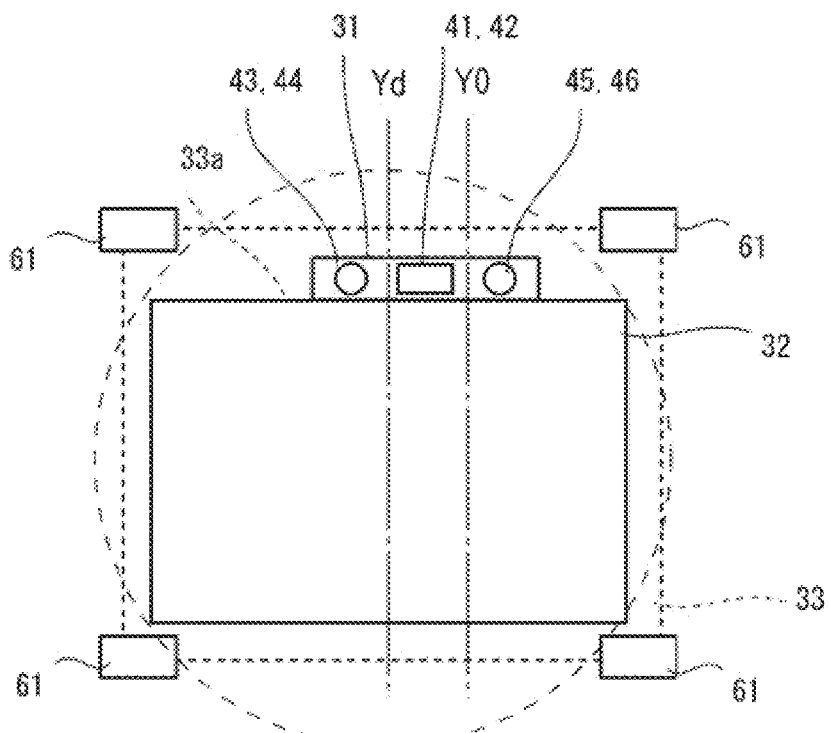
FIG. 10 is a diagram illustrating disposition of the camera module including the imaging sensor relative to the display operation panel of the liquid crystal device according to a modified example of FIG. 9.

FIG. 10 is a diagram illustrating disposition of the camera module 31 including the imaging sensor 41 relative to the display operation panel 33 of the liquid crystal device 32 according to a modified example of FIG. 9.

In FIG. 10, the liquid crystal device 32 has a substantially quadrangular display area. Also in this case, effects similar to those of the embodiment described above can be attained by disposing the camera module 31 along the upper edge of the quadrangular display area. The imaging sensor 41, the first LED 43, and the second LED 45 of the camera module 31 are disposed within a circumscribed circle of an image display area (dashed circle in the drawing). When the display operation panel 33 of the liquid crystal device 32 is shifted toward the passenger side, the imaging sensor 41 is inclined toward the driver, and the center position of the imaging sensor 41 is set between the center position Yd of the quadrangular display area and the center position Y0 of the body 2 in the vehicle width direction. Thus, it is possible to attain effects similar to those of the embodiment described above.

In the embodiment described above, the display operation panel 33 of the liquid crystal device 32 and the imaging sensor 41 are disposed at the center of the automobile 1 in the vehicle width direction. The imaging sensor 41 has the wide-angle imaging lens 42 at the angle of view at which the heads of the plurality of occupants seated in the front row of the automobile can be imaged while being disposed at the center of the automobile 1 in the vehicle width direction. The monitoring controller 36 determines at least one of the line of sight of the occupant or whether the eyes of the occupant are open or closed as the conditions of the occupants in the automobile 1.

The occupant monitoring device may omit any one of the elements described above. For example, the occupant monitoring device may monitor the driver. Also in this case, the improvement in the probability of the monitoring determination is expected, for example, when the imaging sensor 41 is disposed on the back of the display operation panel 33 of the liquid crystal device 32 within a circumscribed circle of the image display area and the monitoring controller 36 determines the conditions of the occupant in the automobile 1 by using the registered captured image data recorded in the memory 35 as the reference data.

The monitoring controller 36 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the monitoring controller 36 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the monitoring controller 36 illustrated in FIG. 3.

The invention claimed is:

1. An occupant monitoring device for a vehicle, the occupant monitoring device comprising:
   a display configured to display a screen to be viewed by occupants in the vehicle, wherein the display is disposed such that 1) a display midline extending between a top and a bottom of the display and running through a display midpoint between a left side and a right side of the display is shifted toward a passenger side of the vehicle from a vehicle midline extending between a front side to a rear side of the vehicle and running through a vehicle midpoint between a passenger side and a driver side of the vehicle and 2) the display intersects the vehicle midline to form an acute angle and an obtuse angle at the intersection of the display and the vehicle midline;
   a panel disposed to overlap the display and extending beyond edges of the display such that 1) a first area of the panel overlaps the display to allow the screen displayed on the display to be viewed by the occupants and 2) a second area of the panel extends beyond the edges of the display;

an imager disposed behind the second area of the panel such that the second area of the panel overlaps the imager when viewed from the occupants while being disposed between the display midline and the vehicle midline and behind the second area of the panel, wherein the imager is configured to capture a first image of each of the occupants in the vehicle while the screen is being displayed on the display; and a determiner configured to determine conditions of the occupants in the vehicle using the captured first image of each of the occupants.

2. The occupant monitoring device for the vehicle according to claim 1,
wherein the display includes a cutout portion along an upper edge of the display, and
wherein the panel is disposed to overlap the display such that the second area overlaps the cutout portion of the display when viewed from the occupants of the vehicle.

3. The occupant monitoring device for the vehicle according to claim 1, wherein the display includes a cutout portion at a center of an upper edge of the display.

4. The occupant monitoring device for the vehicle according to claim 1, wherein the second area of the panel is bilaterally symmetrical in a left and right direction of the display.

5. The occupant monitoring device for the vehicle according to claim 1, further comprising a retainer that retains a peripheral edge of the panel,
wherein the imager is provided on an inner side of the retainer.

6. The occupant monitoring device for the vehicle according to claim 1, further comprising a camera module comprising the imager and a light projector configured to project light toward at least a driver who drives the vehicle,
wherein the light projector of the camera module is disposed on behind the second area of the panel together with the imager.

7. The occupant monitoring device for the vehicle according to claim 1, wherein a wide-angle lens having an angle of view at which heads of ones of the occupants are imageable is laid over the imager, the ones of the occupants being seated in a front row of the vehicle.

8. The occupant monitoring device for the vehicle according to claim 1, further comprising a recorder configured to record the captured first image of each of the occupants,
wherein the determiner is configured to determine the conditions of the occupants in the vehicle by using the captured first image recorded in the recorder.

9. The occupant monitoring device for the vehicle according to claim 1, further comprising a recorder configured to record 1) the first image of each of the occupants captured by the imager and 2) a second image, different from the first image, of each of the occupants in the vehicle captured by the imager, wherein the first image of each of the occupants is captured by the imager while the occupants are looking toward the display on which the screen being displayed, and the second image of each of the occupants is captured by the imager while the occupants are looking forward toward the front side of the vehicle, and wherein the determiner is configured to:
estimate a frontal image of the each of the occupants currently obtained by the imager based on a difference between the first image of the each of the occupants and the second image of the each of the occupants that are recorded in the recorder; and
determine the condition of the each of the occupants in the vehicle based on an image component in the estimated frontal image of the occupant.

10. The occupant monitoring device for the vehicle according to claim 1, wherein the determiner is configured to determine at least one of a condition of eyes of a driver who drives the vehicle or a line of sight of the driver as a condition of the driver in the vehicle.

11. An occupant monitoring device for a vehicle, the occupant monitoring device comprising:
a display comprising a panel configured to display a screen to be viewed by occupants in the vehicle, wherein the display is disposed such that 1) a display midline extending between a top and a bottom of the display and running through a display midpoint between a left side and a right side of the display is shifted toward a passenger side of the vehicle from a vehicle midline extending between a front side to a rear side of the vehicle and running through a vehicle midpoint between a passenger side and a driver side of the vehicle and 2) the display intersects the vehicle midline to form an acute angle and an obtuse angle at the intersection of the display and the vehicle midline;
a panel disposed to overlap the display and extending beyond edges of the display such that 1) a first area of the panel overlaps the display to allow the screen displayed on the display to be viewed by the occupants and 2) a second area of the panel extends beyond the edges of the display;
an imager disposed behind the second area of the panel such that the second area of the panel overlaps the imager when viewed from the occupants while being disposed between the display midline and the vehicle midline and behind the second area of the panel, wherein the imager is configured to capture a first image of each of the occupants in the vehicle while the screen is being displayed on the display; and
circuitry configured to determine conditions of the occupants in the vehicle using the captured first image of each of the occupants.

* * * * *